Feb. 7, 1950 W. F. SPANG 2,497,038
MEAT TENDERIZING MACHINE
Filed Feb. 25, 1946 5 Sheets-Sheet 4

Inventor:
William F. Spang,
by Kenway + Witter
Attorneys

Feb. 7, 1950 W. F. SPANG 2,497,038
MEAT TENDERIZING MACHINE
Filed Feb. 25, 1946 5 Sheets-Sheet 5
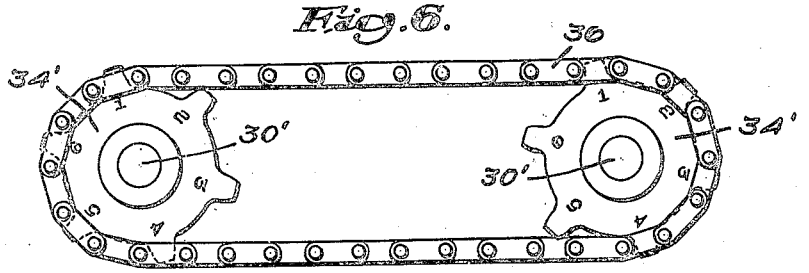
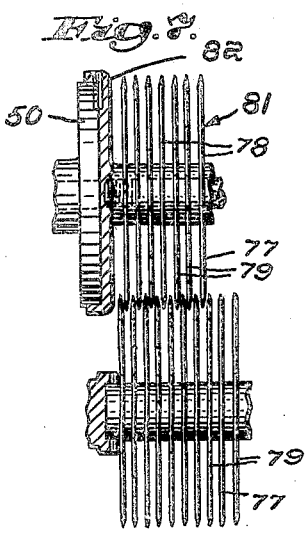
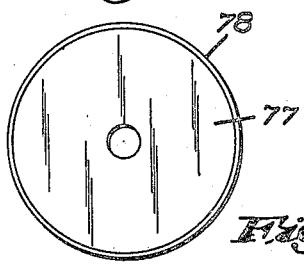
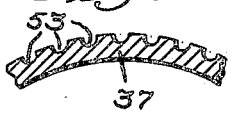
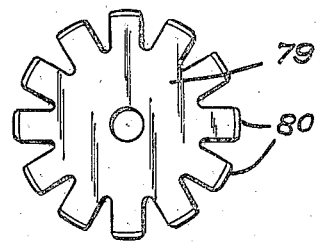
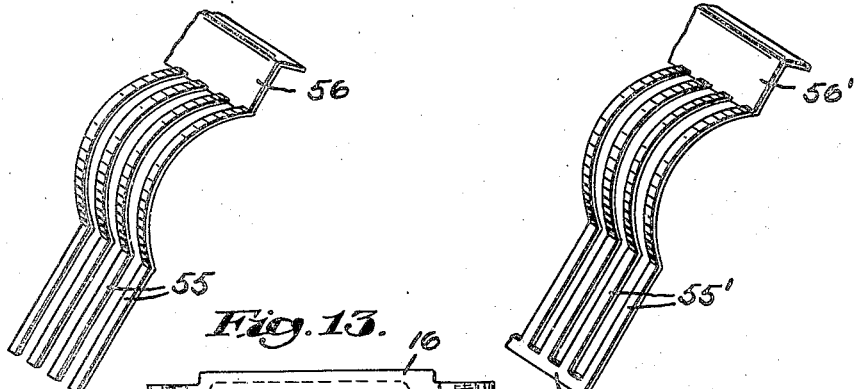
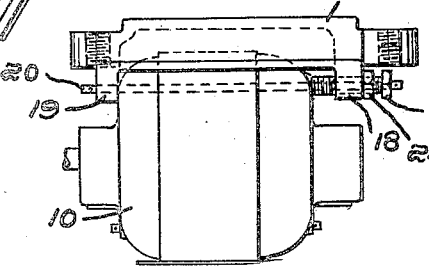
Inventor:
William F. Spang,
by Kenway & Witter
Attorneys Patented Feb. 7, 1950

2,497,038

UNITED STATES PATENT OFFICE 2,497,038

MEAT TENDERIZING MACHINE

William F. Spang, Milton, Mass., assignor to Cube Steak Machine Co., Boston, Mass., a partnership Application February 25, 1946, Serial No. 649,836

13 Claims. (Cl. 17—26)

This invention relates to a new and improved machine for tenderizing meat by passing it over one or more rotary gangs of disk-like knives which thereupon pierce and slit the meat in a manner severing the fibres therein and tenderizing it without crushing, mangling or tearing the meat or causing it to lose the valuable juices stored up in its cells. The object of the invention more particularly concerns the development of a machine of this nature having improved and compact structural features not only rendering the machine efficient but also improving its appearance and facilitating its manufacture and use.

The machine is driven by an electric motor and my improved construction employs a novel mounting of the meat treating mechanism directly on and above the motor and for relative straight line adjustment which always maintains such mechanism in uniform position within its housing and serves to place the proper tension on the driving belt from the motor. Further features of the invention relate to cylindrical meat treating units for conducting the meat through the machine and simultaneously tenderizing it by knife-piercing and slicing functions, together with means for conducting the treated meat from the machine and means permitting the interchangeable replacing of the treating units when occasion requires, all as hereinafter more specifically described.

These and other features of the invention will be best understood and appreciated from the following description of a preferred embodiment thereof selected for purposes of illustration and shown in the accompanying drawings in which—

Figure 1:
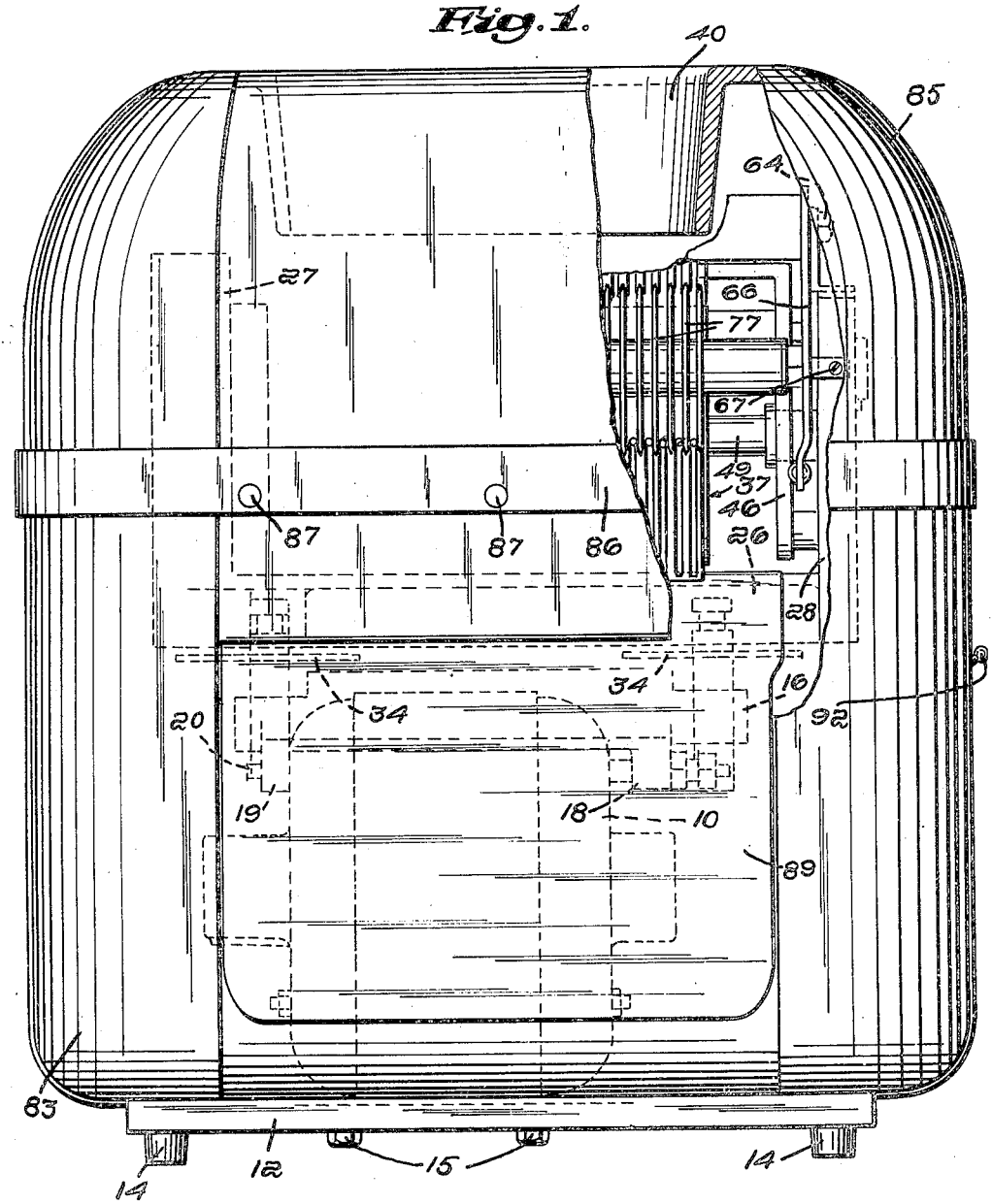
Figure 2:
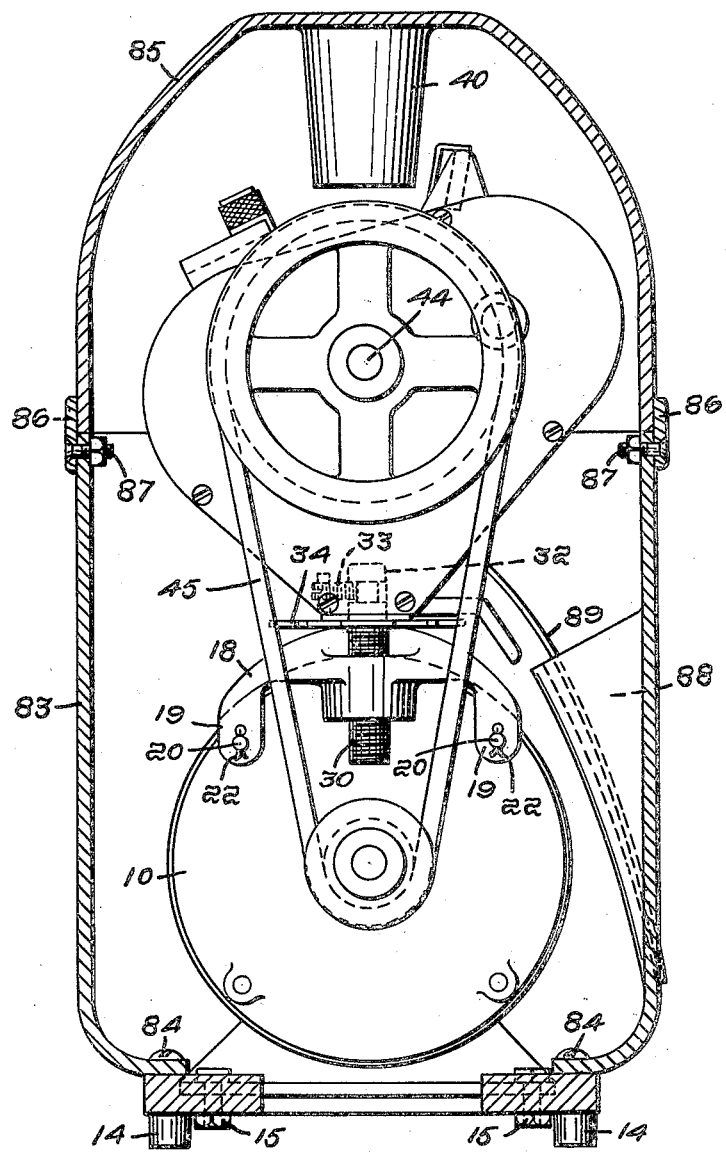
Figure 3:
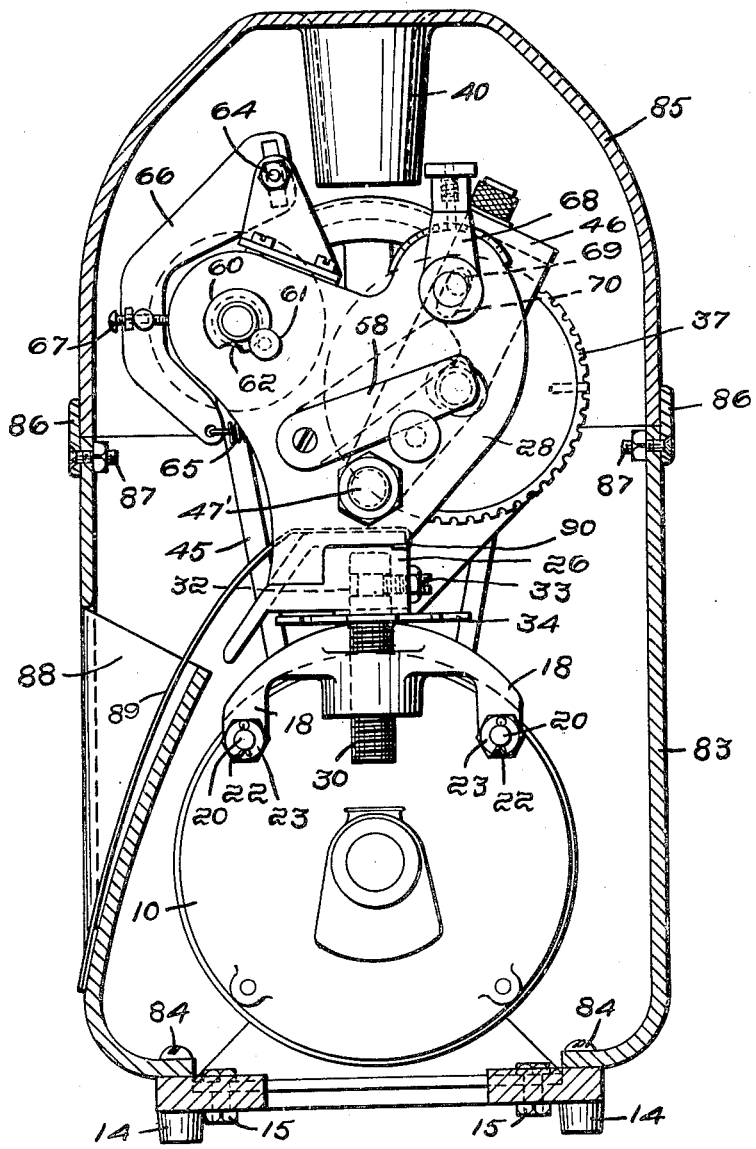
Figure 4:
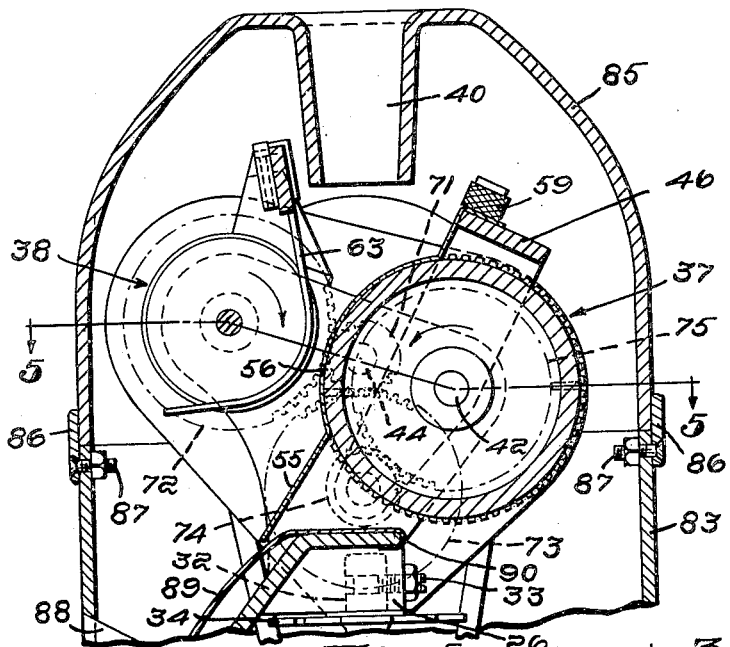
Figure 5:
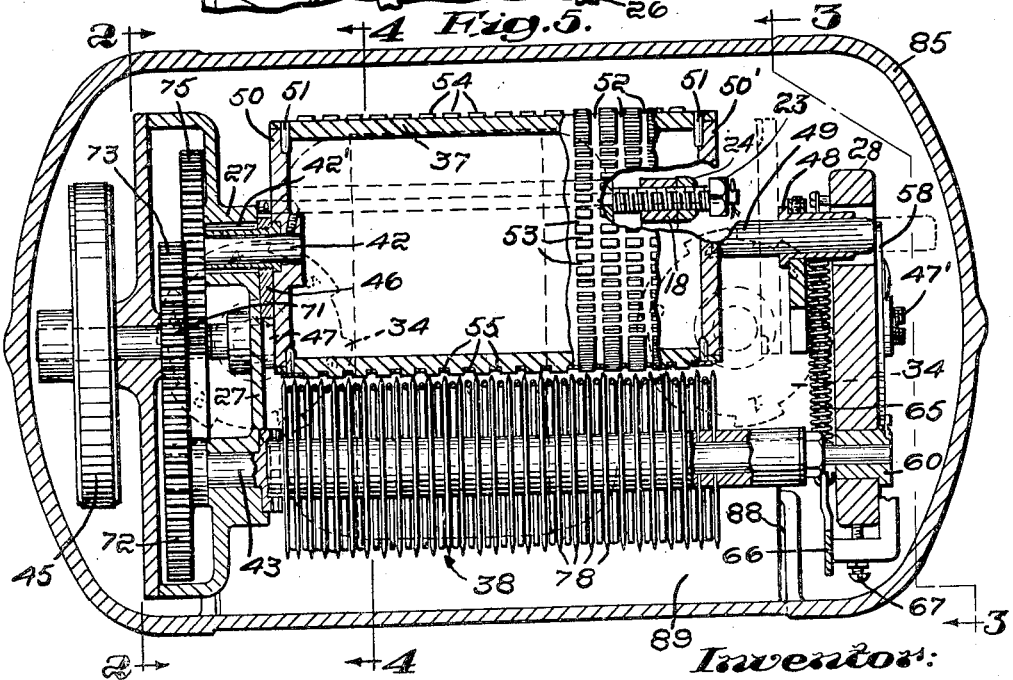

Fig. 1 is a front elevation of my improved tenderizing machine, a portion of the housing being broken away to show the interior mechanism, Fig. 2 is an end elevation of the machine taken through the housing on line 2—2 of Fig. 5, Fig. 3 is a view of the other end taken on line 3—3 of Fig. 5, Fig. 4 is a fragmentary sectional view taken on line 4—4 of Fig. 5, Fig. 5 is a sectional plan view taken on line 5—5 of Fig. 4, Fig. 6 is a plan view of a detail, Fig. 7 is a fragmentary view of two gangs of meat treating knives or disks, Fig. 8 illustrates a slitting disk, Fig. 9 illustrates a piercing disk, Fig. 10 is an enlarged fragmentary view through the meat supporting cylinder, Fig. 11 is a fragmentary view of a stripper plate, Fig. 12 is a like view of a modified construction, and Fig. 13 illustrates the mounting of the base block on the motor.

My improved meat tenderizing machine illustrated herein is driven by an electric motor 10 disposed at the base of the machine and preferably mounted on a base plate 12 supported on rubber studs 14, the motor being secured to the plate by bolts 15. I support the tenderizing mechanism directly on and above the motor by the employment of a novel base block 16. This block has depending therefrom two pairs of lugs respectively at opposite sides of the motor (Fig. 2), each pair comprising two lugs 18 and 19 respectively at opposite ends of the motor. A straight rod 20 extends through each pair of lugs and through the motor between the lugs and is retained by two cotter pins 22 at its ends. A sleeve 23 on each rod is threaded through its lug 18 into contact with the motor and serves to draw the lug 19 into contact with the motor and grasp the motor tightly between the oppositely disposed lugs. The rods remain free and loose and serve only to hold the parts in straight alignment. The sleeves are secured by check nuts 24.

Disposed above and supported on the base block 16 is a U-shaped block 26 having opposed and upwardly extending spaced legs 27 and 28 at its two ends. The supporting means for the block 26 comprises two studs 30 threaded into the block 16 at opposite ends of the motor. The top ends of the studs extend upwardly into bores 32 in the block 26 and are held therein by set screws 33. An intermediately disposed rotating flange 34 is provided on each stud and the flanges are marked with numerals (Figs. 5 and 6) for the purpose of gauging equal rotation of the studs. It may be desirable in some cases to connect the studs for simultaneous rotation, as by a chain 36 engaging sprockets 34'. It will be apparent that rotation of the studs serves to elevate and lower the block 26 and that simultaneous and equal rotation of the studs effects vertical straight line adjustment of the block.

The function of the block 26 is to carry the meat treating units. The units illustrated in Figs. 4 and 5 comprise a tubular cylinder 37 and a cylindrical gang 38 of disk-like cutting knives. These units are disposed beneath a meat guiding chute 40 and the knives are adapted to pierce and slit the meat as it passes downwardly between the two units.

Two parallel shafts 42 and 43 rotatably supported on the block 26 as hereinafter described are driven through gearing from a main shaft 44 in turn driven from the motor 10 through a belt 45. The shafts 43 and 44 are mounted in bearings in the leg 27. The shaft 42 is mounted in a bearing in one leg of a yoke 46 pivoted at 47 and 47' to and between the legs 27 and 28. The other leg of the yoke carries a sleeve 48 supporting a stud 49 slidable therein. Two disk-like elements 50 and 50' are mounted on the shaft 42 and stud 49 for engaging the ends of the cylinder 37, keys 51 being provided for supporting the cylinder to rotate with the two elements. The sleeve 48 and the bearing supporting the shaft 42 provide coaxial bearings in the two legs of the yoke for rotatably supporting the cylinder on an axis fixed relative to the yoke and disposed remotely from and parallel with the yoke's pivotal axis at 47—47'. The units 37 and 38 are mounted in the block coaxially of and driven by the shafts 42 and 43 and are removable for cleaning and interchanging by mechanism hereinafter described.

The cylinder 37 is preferably constructed of plastic material and its outer cylindrical portion is grooved circumferentially at 52 and longitudinally at 53 to provide meat engaging studs 54. The grooves 52 accommodate the fingers 55 and 55' of stripping plates 56 and 56' and the bottoms of the longitudinal grooves 53 are preferably of curved configuration (Fig. 10) to eliminate chipping and give additional strength to the studs 54. The fingers of the stripping plate can be individually free at their ends as illustrated in Fig. 11 or connected together as illutrated at 57 in Fig. 12. The cylinder is of tubular construction and its two open ends are adapted to be engaged by the disk-like elements 50 and 50' having notches for non-rotatable engagement with the keys 51 in the ends of the cylinder. A latch 58 pivoted to the leg 28 normally serves to hold the element 49 in cylinder supporting position. Raising of the latch to the broken line position of Fig. 3 permits withdrawing of the element and removing of the cylinder.

The unit 39 has a key at one end for nonrotatably engaging the shaft 43 and its other end is supported in a bushing 60 in the leg 28. This unit can be removed by withdrawing the bushing and sliding the unit from its engagement with the shaft. The bushing is secured in operative position by the head of a pin 61 and can be withdrawn by rotating the bushing to a position wherein a notch 62 therein is in register with the pin (Fig. 3).

A stripper plate 63 pivoted to legs 27 and 28 of the block 26 at 64 has stripping fingers disposed between the cutting disks as illustrated in Fig. 4. A spring 65 attached to an arm 66 normally pivots the plate and fingers outwardly and is under the control of an adjusting screw 67 to provide for different thicknesses of meat. The function of the fingers is to hold the meat in contact with the cylinder 37, the fingers being adjusted to a position closer to the cylinder when relatively thin slices are to be treated, as will be understood. Otherwise, relatively thin slices of meat would not have sufficient frictional contact with the cylinder to be carried past and treated by the knives.

The depth of cut is regulated by adjusting the yoke 46 and with it the cylinder 37 toward and from the unit 38 and the following described means is provided for this purpose. An adjusting element 68 (Fig. 3) is rotatably mounted in the leg 28 and has an eccentrically mounted stud 69 engaging in a slot 70 in the yoke. Pivotal movement of the element 68 will move the yoke and cylinder toward and from the unit 38 as will be apparent. The element 68 is provided with a spring pressed detent for engaging cooperating teeth on the yoke (Fig. 3) for holding the element in adjusted position and the leg 27 is slotted at 42' to permit lateral movement of the shaft 42 when the yoke is adjusted.

The following described mechanism is provided for driving the units 37 and 38. A pinion 71 on the shaft 44 (Fig. 4) drives the unit 38 by its meshing engagement with a gear 72 fixed to the shaft 43. The pinion 71 is also in mesh with a gear 73 coaxial of and fixed to rotate with a pinion 74 at the pivotal axis 47 and 47' of the yoke 46. The pinion 74 is in mesh with a gear 75 fixed to the shaft 42. Thus the gears 74 and 75 remain in full meshing engagement in all positions of adjustment of the yoke.

The unit 38 illustrated in Fig. 5 comprises a gang of slitting disks 77 each having a continuous cutting edge 78 at its periphery (Fig. 8) but can comprise piercing disks 79 having discontinuous cutting edges 80 (Fig. 9) or any combination of such disks. Furthermore the machine can employ two gangs of slitting and piercing disks as illustrated in Fig. 7. The gang 81 is provided with disk-like elements 82 at its ends for cooperation with the holding elements 50 and 50', thus permitting the gang 81 to be substituted for the cylinder 37. It will be apparent that the units illustrated in Fig. 7 are adapted to cut at both faces of the meat whereas in the construction illustrated in Fig. 5 one face of the meat is cut by the knives while the meat is supported at its other face on the cylinder 37.

The machine is preferably enclosed within a housing and I have herein illustrated the same as comprising a lower portion 83 mounted on and secured to the base plate 12 at 84 and open at its top end. A removable top cover portion 85 is mounted in abutting engagement on the portion 83. The portions 83 and 85 are preferably formed of plastic material and a metal band 86 is secured to and extends about the top margin of the portion 83 in position to receive and support the bottom end of the cover in abutting engagement, bolts and nuts 87 being provided for securing the band to the housing. The meat guiding chute 40 is an integral part of the top cover portion 85. The front side wall of the lower portion 83 is molded to provide an opening at 88 therethrough and cooperating with this opening is a meat guiding apron 89. The configuration of the apron as illustrated in Fig. 3 embodies a hooked top portion 90 in hooked engagement with the base portion of the block 26. The apron extends therefrom outwardly of the opening through the front wall of the housing. The arrangement permits quick and convenient removal of the apron for cleaning. The stripper plate 56 or 56' overlaps the apron (Fig. 4) and is adapted to deliver the treated meat thereto. The motor is controlled by a hand switch 92.

It will now be apparent that I have produced and herein disclose a superior meat tenderizing machine having various novel and improved features of construction and operation. The compact arrangement includes the novel mounting of the meat treating mechanism directly on and above the motor for straight line adjustment as and for the purpose described. The meat treating units are conveniently removable for cleaning and interchangeable for the purpose of adapting the machine to perform different meat treating functions either at one or both faces of the meat. The mechanism is furthermore conveniently and compactly enclosed within an attractive housing which serves the function of protecting the machine and giving the apparatus an attractive appearance. It will furthermore be apparent that the machine can be readily cleaned and sterilized for each use, the convenient removal of the top cover 85, the cylindrical meat treating units 37 and 38 and the apron 89 being particularly adapted to serve this function.

The novel mounting and functioning of the stripper plate 63 for such pressure engagement with the meat as to hold it in contact with the cylinder 37 and conduct it continuously past the cutting knives is of considerable importance in the successful and efficient operation of the machine. Also the novel mounting of the yoke 46 for adjustment together with the cylinder 37 toward and from the treating unit 38 while maintaining full driving engagement with the cylinder is an important feature of the invention. These and other novel features herein disclosed, including the interchangeability of the cylindrical treating units whereby a single machine is adapted to perform various treatments merely by changing such units, provide a substantially superior and more efficient meat tenderizing machine of the nature herein disclosed.

Having thus disclosed my invention what I claim as new and desire to secure by Letters Patent is:

1. A meat tenderizing machine comprising a motor, a U-shaped block disposed above the motor, two rotary and parallel shafts carried by the block, means including a belt for driving one of the shafts from the motor and including gearing connecting the shafts for rotation in opposite directions, two cylindrical meat treating units supported in the block co-axial with and driven by said shafts, means providing a guiding chute above and disposed to feed meat to said treating units, and means for bodily adjusting the block in a straight line toward and from the chute relative to the motor.

2. The machine defined in claim 1 in which the last named means comprises screw-threaded elements supporting the block on the motor.

3. The machine defined in claim 1 in which the last named means comprises screw-threaded elements supporting the block on the motor, rotation of said screw-threaded elements being adapted to adjust the block toward and away from the motor, and means connecting the screw-threaded elements for simultaneous and equal rotation.

4. The machine defined in claim 1 plus a housing disposed about the machine and supporting said chute, and an apron in hooked engagement at its top end with the block and extending therefrom outwardly through an opening in the housing, the apron being adapted to receive the treated meat from said units and direct the same outwardly of the housing.

5. The machine defined in claim 1 in which one of said meat treating units comprises a tubular cylinder grooved longitudinally and circumferentially to provide meat engaging studs on its outer cylindrical surface, the other unit comprising a plurality of disks mounted in spaced relation on and along a shaft disposed axially of the unit and having sharp peripheral edges for cutting meat supported on the studs of the cylinder, and means for removably and interchangeably supporting said units in the block for rotation with and by the shafts.

6. The machine defined in claim 1 in which one of said meat treating units comprises a tubular cylinder of plastic material open at its ends, the outer cylindrical surface of the cylinder being grooved longitudinally and circumferentially to provide meat engaging studs and the bottoms of the longitudinal grooves being of curved configuration, the other unit comprising a plurality of disks mounted in spaced relation on and along of a shaft disposed axially of the unit and having sharp peripheral edges for cutting meat supported on the studs of the cylinder, disk-like elements carried by the block for engaging the ends of the cylinder and supporting it rotatably in the block, and disk-like elements carried by said other unit at its ends for cooperating with the first named elements for rotatably and interchangeably mounting said other unit in the block.

7. The machine defined in claim 1 plus a base block mounted on the motor and cooperating with the last named means for supporting the U-shaped block, two spaced and downwardly extending lugs carried by the base block, a straight rod extending through the lugs and through the motor between the lugs, and a sleeve on the rod threaded through one of the lugs into engagement with the motor and holding the other lug in tight contact with the motor.

8. The machine defined in claim 1 plus a base block mounted on the motor and cooperating with the last named means for supporting the U-shaped block, two pairs of downwardly extending lugs carried by the base block respectively at opposite sides of the motor, each pair comprising two lugs respectively at opposite ends of the motor, a straight rod extending through each pair of lugs and through the motor between the lugs, and a sleeve on each rod threaded through one lug of each pair and into engagement with the motor and holding the other lug of the pair in tight contact with the motor.

9. A meat tenderizing machine, comprising a U-shaped block, a cylindrical meat treating unit rotatably mounted in the block, a second and cooperating cylindrical meat treating unit disposed parallel with and adjacent to the first unit, a yoke pivotally mounted in the block and rotatably supporting the second unit at its ends and at a point remote from the pivot axis, means for adjusting the yoke about said axis to move the second unit toward and from the first unit without disturbing said parallel relationship, and means for rotating the units in opposite directions synchronously.

10. A meat tenderizing mechine, comprising a cylinder, a gang of disk-like cutters disposed parallel with and adjacent to the cylinder, a pivotally mounted yoke rotatably supporting the cylinder at its ends in coaxial bearings in the yoke, the axis of said bearings being fixed relative to the yoke and disposed remotely from and parallel with the pivotal axis of the yoke, means for adjusting the yoke about said axis to move the cylinder toward and from the cutters without disturbing said parallel relationship, and means for rotating the cylinder and cutters in opposite directions synchronously in all positions of yoke adjustment.

11. A meat tenderizing machine comprising a base, a housing mounted on the base and providing an upwardly open chamber thereabove, a motor on the base in the chamber, a U-shaped block disposed above the motor, means supporting the block on and for adjustment toward and away from the motor, two parallel shafts rotatably mounted in one leg of the block, driving means for the shafts including a belt from the motor to one of the shafts, two cylindrical meat treating units supported in the block coaxial with and driven by said shafts, a top cover for the housing having a downwardly extending passage disposed to feed meat to and between said elements, and means for receiving the treated meat from the elements and directing the same outwardly through an opening in a side wall of the housing.

12. The machine defined in claim 11 in which the cover is in abutting engagement and coextensive with the open end of the housing, and a metal band extending about the housing at its outer face adjacent to and extending above its top end, the band being adapted to receive and support the bottom end of the cover in said abutting engagement.

13. A meat tenderizing machine comprising a motor, a U-shaped block mounted on the motor and having two spaced legs extending upwardly therefrom, a cylinder rotatably supported on the block between the legs, a gang of disk-like cutters on the block parallel with and adjacent to the cylinder, a stripper plate between and pivoted to the legs and having fingers disposed between the cutters in opposed relation to the cylinder, resilient means operative on the stripper plate to move the fingers toward the cylinder, means including an adjusting screw for limiting such movement in the direction of the cylinder, and means for rotating the cylinder and cutters in opposite directions synchronously from the motor.

WILLIAM F. SPANG.

REFERENCES CITED

The following references are of record in the file of this patent:

UNITED STATES PATENTS

| Number | Name | Date |
|---|---|---|
| 2,051,207 | Ferry | Aug. 18, 1936 |
| 2,171,900 | Spang | Sept. 5, 1939 |
| 2,263,855 | Spang | Nov. 25, 1941 |